(12) United States Patent
Shuman et al.

(10) Patent No.: US 8,744,509 B2
(45) Date of Patent: Jun. 3, 2014

(54) REDUCING TIME FOR CALL FAILURE INDICATION

(75) Inventors: Mohammed Ataur Rahman Shuman, San Diego, CA (US); Ashutosh Aggarwal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 287 days.

(21) Appl. No.: 12/751,624

(22) Filed: Mar. 31, 2010

(65) Prior Publication Data
US 2010/0260107 A1 Oct. 14, 2010

Related U.S. Application Data

(60) Provisional application No. 61/167,697, filed on Apr. 8, 2009.

(51) Int. Cl.
*H04W 24/00* (2009.01)

(52) U.S. Cl.
USPC ........................... 455/518; 455/517; 455/519

(58) Field of Classification Search
USPC .................................................. 455/517–519
See application file for complete search history.

(56) References Cited

U.S. PATENT DOCUMENTS

| | | | | |
|---|---|---|---|---|
| 7,221,670 | B2 * | 5/2007 | Sayeedi et al. ................ | 370/342 |
| 7,830,812 | B2 * | 11/2010 | Atkins et al. ................... | 370/252 |
| 8,045,515 | B2 * | 10/2011 | Nookala et al. ............... | 370/329 |
| 2003/0031159 | A1 * | 2/2003 | Sayeedi et al. ................ | 370/342 |
| 2005/0063329 | A1 * | 3/2005 | Lee et al. ....................... | 370/328 |
| 2005/0124367 | A1 | 6/2005 | Hassan et al. | |
| 2005/0272454 | A1 * | 12/2005 | Hiller et al. .................... | 455/518 |
| 2007/0153676 | A1 * | 7/2007 | Baglin et al. ................... | 370/216 |
| 2007/0153750 | A1 * | 7/2007 | Baglin et al. ................... | 370/338 |
| 2007/0153751 | A1 * | 7/2007 | Svensson et al. ............. | 370/338 |
| 2008/0004035 | A1 * | 1/2008 | Atkins et al. ................... | 455/454 |
| 2008/0153480 | A1 | 6/2008 | Jiang | |
| 2008/0159240 | A1 | 7/2008 | Hamilton | |
| 2009/0073933 | A1 * | 3/2009 | Madour et al. ................ | 370/331 |

(Continued)

FOREIGN PATENT DOCUMENTS

| | | |
|---|---|---|
| CN | 101077031 A | 11/2007 |
| JP | 2005354692 A | 12/2005 |
| JP | 2007515884 A | 6/2007 |
| WO | 2007149025 A1 | 12/2007 |

OTHER PUBLICATIONS

International Preliminary Report on Patentability—PCT/US2010/030184, The International Bureau of WIPO—Geneva, Switzerland, Jul. 6, 2011.

(Continued)

*Primary Examiner* — Bobbak Safaipour
(74) *Attorney, Agent, or Firm* — Raphael Freiwirth

(57) ABSTRACT

Techniques are disclosed for reducing the time for a wireless communication device originating a group communication, such as a push-to-talk call, to receive a call failure indication on a wireless communications system. In an embodiment, a group communications server receives a request to initiate a call with a target from an originator, and sends a corresponding message to a network node. If the call cannot be completed, the server receives from the network node an internet control message protocol (ICMP) message indicative of there being no connection between the network node and the target wireless communication device. In response to the message, the group communications server sends a status failure message to the originating wireless communication device.

39 Claims, 8 Drawing Sheets

(56) References Cited

U.S. PATENT DOCUMENTS

| | | | |
|---|---|---|---|
| 2009/0207808 A1* | 8/2009 | McCann et al. | 370/331 |
| 2009/0207821 A1* | 8/2009 | Rune | 370/338 |
| 2009/0271656 A1* | 10/2009 | Yokota et al. | 714/6 |
| 2010/0056109 A1* | 3/2010 | Wilson et al. | 455/412.1 |
| 2010/0215052 A1* | 8/2010 | Liu et al. | 370/463 |
| 2010/0235890 A1* | 9/2010 | Cakulev et al. | 726/5 |

OTHER PUBLICATIONS

International Search Report, PCT/US2010/030184, International Searching Authority, European Patent Office, Jul. 6, 2010.
Written Opinion, PCT/US2010/030184, International Searching Authority, European Patent Office, Jul. 6, 2010.

* cited by examiner

REDUCING TIME FOR CALL FAILURE INDICATION

CLAIM OF PRIORITY UNDER 35 U.S.C. §119

The present application for patent claims priority to Provisional Application No. 61/167,697 entitled "REDUCING TIME FOR CALL FAILURE INDICATION WHERE TARGET DEVICE IS UNREACHABLE BUT STILL REGISTERED WITH THE ALL SERVER" filed Apr. 8, 2009, and assigned to the assignee hereof and hereby expressly incorporated by reference herein.

BACKGROUND OF THE INVENTION

1. Field of the Invention

Aspects of the disclosure relate to measuring the performance of call completion in wireless communications systems. More specifically, various embodiments are directed to calculating real-time performance and load statistics in a group communication wireless communication system, such as a push-to-talk system.

2. Description of the Related Art

In wireless telecommunication devices, such as cellular phones, PDAs, mini-laptops, and advanced pagers, the devices typically communicate over long distances by bridging telephone calls through existing cellular telephone networks and passing data packets across the network. These wireless devices have varying data processing and computing capability, and can accordingly send and receive software programs, in addition to voice, across the wireless network.

One wireless telecommunication service provides a quick one-to-one or one-to-many communication that is generically referred to as "Push to talk over cellular" ("PTT PoC," "push to talk," "PTT") capability. The specific PTT group of recipient devices for the communicating wireless device is commonly set up by the carrier. A PTT communication connection is typically initiated by a single button-push on the wireless device that activates a half-duplex link between the speaker and each member device of the group so that the wireless device can speak on the "floor" and once the button is released, the floor is released and the wireless device can receive incoming PTT transmissions. In some arrangements, the PTT speaker will have the "floor" where no other group member can speak while the speaker is speaking. Once the speaker releases the PTT button, any other individual member of the group can engage their PTT button and they will have the floor.

In a PTT environment, when the PTT server sends an ANNOUNCE message to a target client, the packet data serving node ("PDSN") receives the ANNOUNCE message and needs to route that message to the target client's wireless communication device. In order to route the ANNOUNCE message to the appropriate radio access network ("RAN"), the PDSN must have an established A10 connection with the RAN. It is possible that the PDSN receives the ANNOUNCE message for a target device without having an established A10 connection with the RAN. This can occur because, due to an internal problem at either the RAN or PDSN, an A10 or point-to-point protocol ("PPP") connection between the RAN and PDSN is not present for the target client device. In current systems, the PDSN will drop the announce message, the PTT server will time out, and will keep resending the ANNOUNCE message according to a preset reliability mechanism. After the reliability mechanism has completed, the server will end the call and send a STATUS failure message to the operator indicating that the target device cannot be reached. There may be several issues associated with this design.

First, the current system may waste server resources to retry the ANNOUNCE message. Second, it may waste over-the-air bandwidth resources for the originating wireless communication device, because the server does not send the STATUS failure before it exhausts the reliability mechanism. Third, in current systems, one cannot infer whether the message reached the target RAN or not from the cause code of the STATUS failure or from the server log. Fourth, during field testing activity when the only logs available are client logs, it is very important to know the exact failure code for the failed call attempt. A generic failed reason of "target unreachable" does not help identify the root cause of the problem.

As such, it would be beneficial to have techniques that increase the speed and minimize the resources involved with communicating a call failure message to an originating wireless communications device.

SUMMARY

In an embodiment, a network communications entity may receive from an originator wireless communications device a request to initiate a call with a target wireless communications device. The network entity may send a call announce message that corresponds to the request to a network node. The network entity may receive from the network node an internet control message protocol (ICMP) message indicative of the node lacking a connection to a radio access network that corresponds to the target. The network entity may send a status failure message to the originator indicative of the call failing. The network communications entity may include a group communication server, a Push-To-Talk (PTT) server, and/or a call server.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
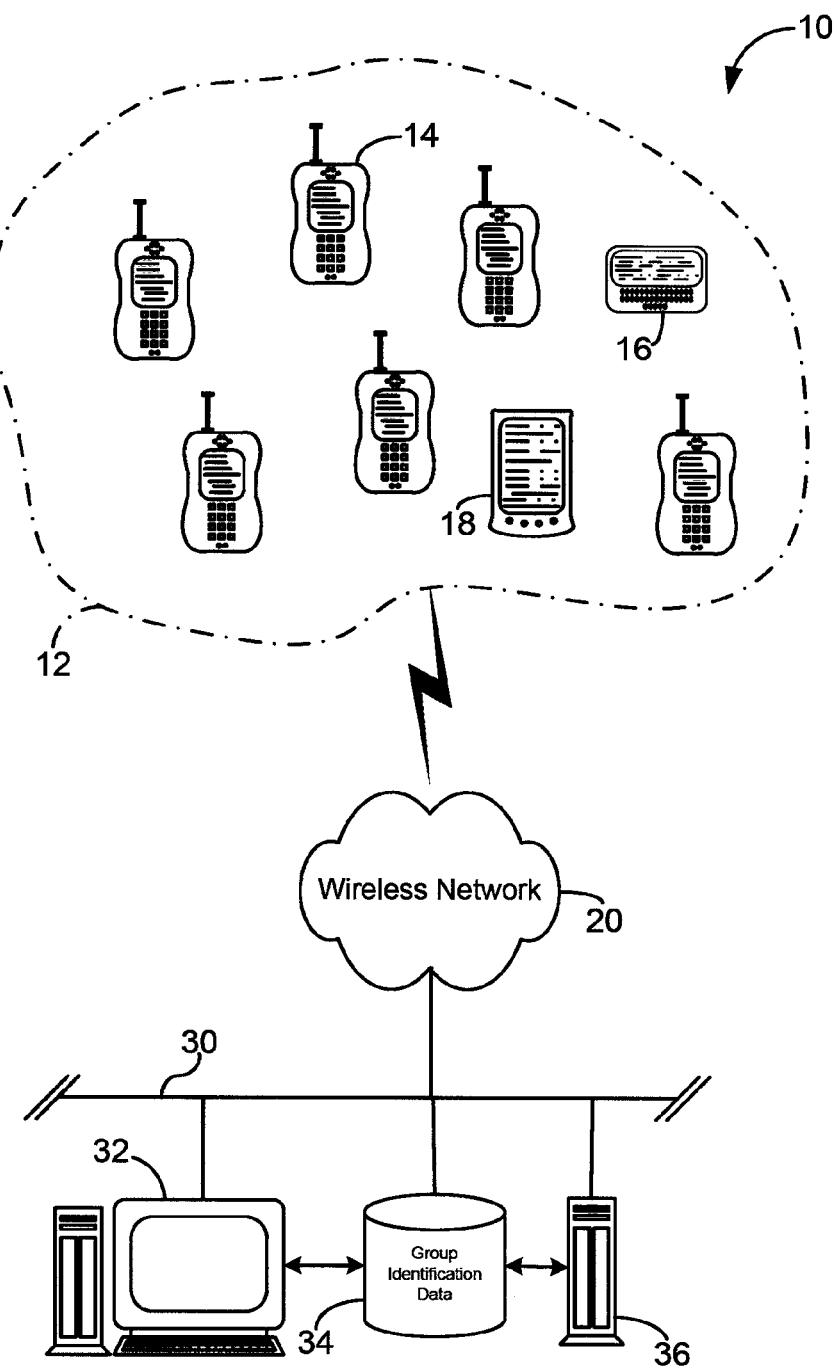
FIG. 1 is a representative diagram of a wireless network with a designated PTT group of wireless telecommunication devices communicating with a group communication server and other computer devices across the wireless network.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

In this description, the terms "communication device," "wireless device," "wireless communications device," "PTT communication device," "handheld device," "mobile device," and "handset" are used interchangeably. The terms "call" and "communication" are also used interchangeably. The term "application" as used herein is intended to encompass executable and non-executable software files, raw data, aggregated data, patches, and other code segments. The terms "group communication" or "PTT call" mean a point-to-point or point-to-multipoint half-duplex communication, either in a true or virtual half-duplex communication channel.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

FIG. 1 illustrates one embodiment of the system 10 for sharing group media among one or more wireless telecommunication devices in a PTT group 12, such as the wireless telephone 14, smart pager 16 and personal digital assistant (PDA) 18, with other wireless telecommunication devices across a wireless network 20. In the system 10, each wireless telecommunication device 14,16,18 is capable of selectively directly communicating across the wireless communication network 20 with a target set of one or more other wireless telecommunication devices of the plurality. For example, the target set for mobile telephone 14 can be all devices in the communication group 12 or a subset thereof, such as pager 16 and PDA 18.

In this embodiment, the wireless telecommunication device (such as mobile telephone 14) notifies at least the group communication computer device, shown here as server 32, which may be present on a server-side LAN 30 across the wireless network 20, to indicate that the wireless device is present, i.e. accessible, on the wireless network 20. The group communication computer device 32 can share this information with the set of target wireless telecommunication devices designated by the wireless telecommunication device, or can also share is with other computer devices resident on the server-side LAN 30 or accessible across the wireless network 20. The group communication computer device 32 can have an attached or accessible database 34 to store the group identification data for the wireless devices. A data store 36, shown here as file management server, is also present on the server-side LAN 30. It should be appreciated that the number of computer components resident on server-side LAN 30, or across the wireless network 20, or Internet generally, are not limited.

The direct communication, such as a PTT communication, can be established through a half-duplex channel between the communicating wireless telecommunication device 14, 16, 18 and the one or more other wireless telecommunication devices of the target set. Also, the group communication computer device 32 can attempt to bridge the requested direct communication with the target set if at least one of the wireless telecommunication devices of the target set have informed the group communication computer device 32 of their presence on the wireless network 20.

The group communication computer device 32 can also inform the wireless telecommunication device 14,16,18 of the inability to bridge a direct communication to the target set 12 upon none of the wireless telecommunication devices (or at least one) of the target set not having informed the group communication computer device 32 of their presence on the wireless network 20. Further, while the group communication computer device 32 is shown here as having the attached database 34 of group identification data, the group communication computer device 32 can have group identity data resident thereupon, and perform all storage functions described herein In overview, the system 10 includes at least one wireless communication device, such as mobile telephone 14, that is a member of a communication group 12 of wireless communication devices that communicate with each other in group communications across a wireless communication network 20. The wireless communication device can also be configured to selectively send group-directed media to other members of the communication group 12, such as voice or other data. At least one group communication computer device 32 may be configured to store information on communication groups 12 on the wireless communication network 20, the information including the identity of the specific member wireless communication devices of one or more communication groups. The group communication computer device 32 may be further configured to selectively receive group-directed media from a sending wireless communication device, such as mobile telephone 14, of a communication group 12 and send the group-directed media to the other member wireless communication devices of the communication group 12 for the sending wireless communication device. The system 10 can further include a data store 36 in communication with the group communication server(s) 32, for access and storage purposes.

The wireless communication device 14, 16, 18 can send communication group identification data to the group communication computer device 32 at the time of requesting the group-directed media to be sent, e.g. send a target list, and thus, the group communication device 32 may send or store the group-directed media to the member wireless communication devices identified in the communication group identification data based upon a variety of criteria as is further discussed herein. Alternately, prior to the wireless communication device sending group-directed media, the wireless communication device 14,16,18 can request member data for a communication group 12 from the group communication computer device 32, and the group communication computer device 32 can send one or more addresses or communication group addresses to the wireless communication device 14,16, 18.

Figure 2:
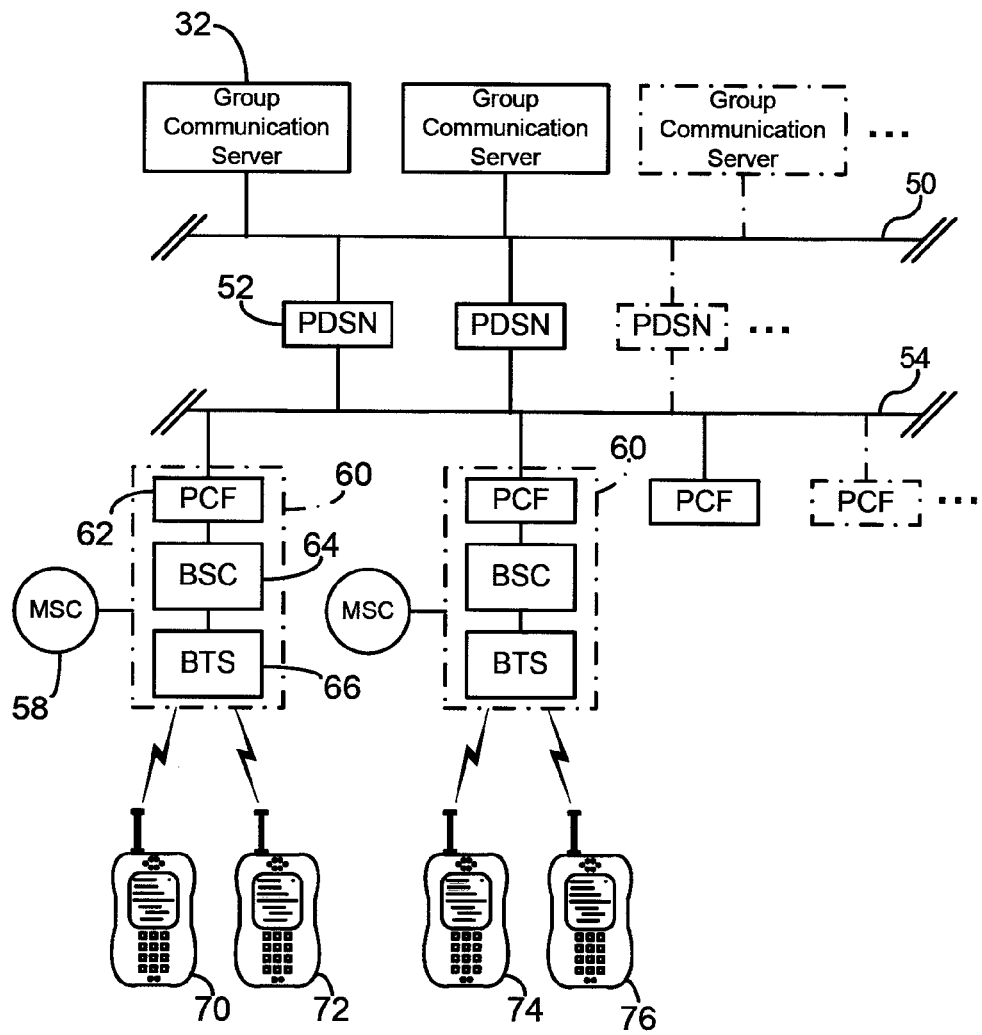
FIG. 2 is a representative diagram of one embodiment of a wireless network in a common cellular telecommunication configuration, having a group communication server control communications between the wireless telecommunication devices of PTT group members.

FIG. 2 is a representative diagram of one embodiment of a wireless network in a common cellular telecommunication configuration, having a series of group communication computer devices (group communication servers) 32 that control communications between the wireless communication devices of set group members (devices 70, 72, 74, 76) in a PTT system. The wireless network is merely exemplary and can include any system whereby remote modules communicate over-the-air between and among each other and/or between and among components of a wireless network 20, including, without limitation, wireless network carriers and/or servers. A series of group communication servers 32 may be connected to a group communication server LAN 50. Wireless telephones can request packet data sessions from the group communication server(s) 32 using a data service option.

The group communication server(s) 32 are connected to a wireless service provider's packet data service node (PDSN) such as PDSN 52, shown here resident on a carrier network 54. Each PDSN 52 can interface with a base station controller 64 of a base station 60 through a packet control function (PCF) 62. The PCF 62 is typically located in the base station 60. The carrier network 54 controls messages (generally in the form of data packets) sent to a messaging service controller ("MSC") 58. The carrier network 30 communicates with the MSC 32 by a network, the Internet and/or POTS ("plain ordinary telephone system"). Typically, the network or Internet connection between the carrier network 54 and the MSC 58 transfers data, and the POTS transfers voice information. The MSC 58 can be connected to one or more base stations 60. In a similar manner to the carrier network, the MSC 58 is typically connected to the branch-to-source (BTS) 66 by both the network and/or Internet for data transfer and POTS for voice information. The BTS 66 ultimately broadcasts and receives messages wirelessly to and from the wireless devices, such as cellular telephones 70,72,74,76, by short messaging service ("SMS"), or other over-the-air methods known in the art. It should also be noted that carrier boundaries and/or PTT operator network boundaries do not inhibit or prohibit the sharing of data as described herein.

Cellular telephones and mobile telecommunication devices, such as wireless telephone 14, are being manufactured with increased computing capabilities and are becoming tantamount to personal computers and hand-held PDAs. These "smart" cellular telephones allow software developers to create software applications that are downloadable and executable on the processor of the wireless device. The wireless device, such as cellular telephone 14, can download many types of applications, such as web pages, applets, MIDlets, games and data. In wireless devices that have designated a communication group 12 (FIG. 1), the wireless communication device can directly connect with the other member of the set and engage in voice and data communication. However, all such direct communications will occur through, or at the control of, the group communication computer device 32. All data packets of the devices do not necessarily have to travel through the group communication computer device 32 itself, but the group communication computer device 32 must be able to ultimately control the communication because it will typically be the only server-side 30 component that is aware of and/or can retrieve the identity of the members of the communication group, or direct the identity of the members of the communication group 12 to another computer device.

Figure 3:
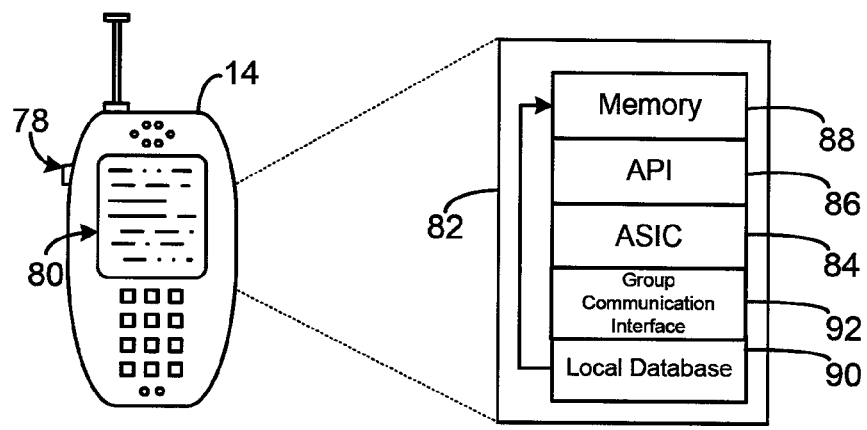
FIG. 3 is a block diagram illustrating the computer platform of the wireless telecommunication device with PTT capability.

FIG. 3 is a block diagram illustrating one embodiment of the wireless telecommunication device being a mobile telephone 14 with a PTT button 78 that opens the direct communication to a target set of devices, i.e. other members of the communication group 12. The wireless device 14 is also shown as having a graphics display 80 to the user of the wireless device 14. The wireless device 14 includes a computer platform 82 that can handle voice and data packets, and receive and execute software applications transmitted across the wireless network 20 to include the group-directed media. The computer platform 82 includes, among other components, an application-specific integrated circuit ("ASIC") 84, or other processor, microprocessor, logic circuit, programmable gate array, or other data processing device. The ASIC 84 is installed at the time of manufacture of the wireless device and is not normally upgradeable. The ASIC 84 or other processor executes an application programming interface ("API") layer 86, which includes the resident application environment, and can include the operating system loaded on the ASIC 84. The resident application environment interfaces with any resident programs in the memory 88 of the wireless device. An example of a resident application environment is the "binary runtime environment for wireless" (BREW) software developed by QUALCOMM® for wireless device platforms.

As shown here, the wireless device can be a mobile telephone 14, with a graphics display 80, but can also be any wireless device with a computer platform 82 as known in the art, such as a personal digital assistant (PDA), a pager with a graphics display 80, or even a separate computer platform 82 that has a wireless communication portal, and may otherwise have a wired connection to a network or the Internet. Further, the memory 88 can be comprised of read-only or random-access memory (RAM and ROM), EPROM, EEPROM, flash cards, or any memory common to computer platforms. The computer platform 82 can also include a local database 90 for storage of software applications not actively used in memory 88. The local database 90 is typically comprised of one or more flash memory cells, but can be any secondary or tertiary storage device as known in the art, such as magnetic media, EPROM, EEPROM, optical media, tape, or soft or hard disk. The graphics display 80 can present not only information about the ongoing group call, but also the information on the group-directed media, to include a file preview as is more fully described herein.

In this embodiment of the wireless device, the computer platform 82 also includes a group communication interface 92 that can open the group communication channel from the wireless device. The group communication interface 92 can also be part of the standard communication interface for the wireless device which ordinarily carries the voice and data transmitted to and from the wireless device. The group communication interface 92 typically is comprised of hardware as is known in the art.

Figure 4:
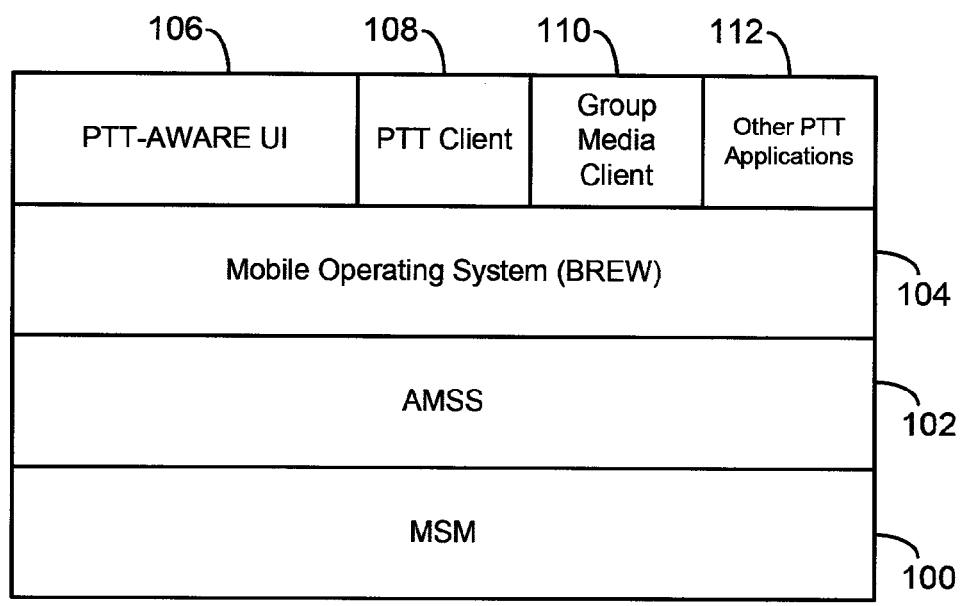
FIG. 4 is a diagram of one embodiment of the software layers of the communication group application, with a PTT client and a group-directed media client.

FIG. 4 is a diagram of one embodiment of the software layers of the group application client, with a PTT facility and a group-directed media facility. In this embodiment, the computer platform 82 in the mobile device environment consists of a series of software "layers" developed on top of the Mobile Station Modem (MSM) 100 and the Advanced Mobile Subscriber Software (AMSS) 102, developed by QUALCOMM, drives the underlying MSM chipset and implements the software protocol stack for the entire suite of CDMA communication technologies that include CDMA2000 1x and CDMA2000 1xEV-DO. There is a mobile operating system layer 104, which in this embodiment is BREW®, also developed by QUALCOMM. The mobile operating system layer 104 application programming interfaces for chip- or device-specific operations, while providing an isolation layer that eliminates direct contact to the AMSS 102 and any OEM software on the computer platform. The mobile operating system layer 104 enables application development that uses mobile device features without having to rewrite the application each time a new release of the device-specific software is released.

The PTT Client 108 is an application that offers access to PTT services through an external interface, here shown at a PTT-aware UI 106. The PTT Client includes all the functions required to enable mobile operating system 104 applications, such as the Group Media Client 110. In addition to providing access to PTT services with the PTT Client 108, the PTT Client 108 preferably acts as an isolation layer between all PTT-aware applications and the interface to the group communication computer device 102. In this embodiment, the PTT Client 108 maintains access to PTT services, responds to group communication requests, processes all PTT-aware mobile operating system applications requests for PTT services, processes all outgoing PTT requests, collects and packages vocoder packets for originating PTT talk spurts, and parses packets of vocoder data for terminated PTT talk spurts.

The Group Media Client 110 is a mobile operating system-based application that extends PTT services for access to media types other than the traditional half duplex voice communications (VoIP-PTT media). The Group Media Client 110 provides access to group-media services through an external interface, in one embodiment being a separate API, such as a Group Media Aware API. The Group Media Aware UI is an application that may be developed entirely as a mobile operating system-based application or used in combination with an AMSS 102 interface. The Group Media Aware UI responds to user requests for group-directed media services by invoking the appropriate APIs, such as those from other resident PTT and group media applications 112. The Group Media Client 110 services the requests from the user and informs the user the result of any group-directed media request. The user can also have setting on the Group Media Client 110, that specify how to handle an incoming notification that indicates there is a file to be downloaded from the file management server (data store 36). For example, the Group Media Client 110 can elect to have the file download commence immediately or to allow the target user to be prompted to determine whether to download the file.

Figure 5:
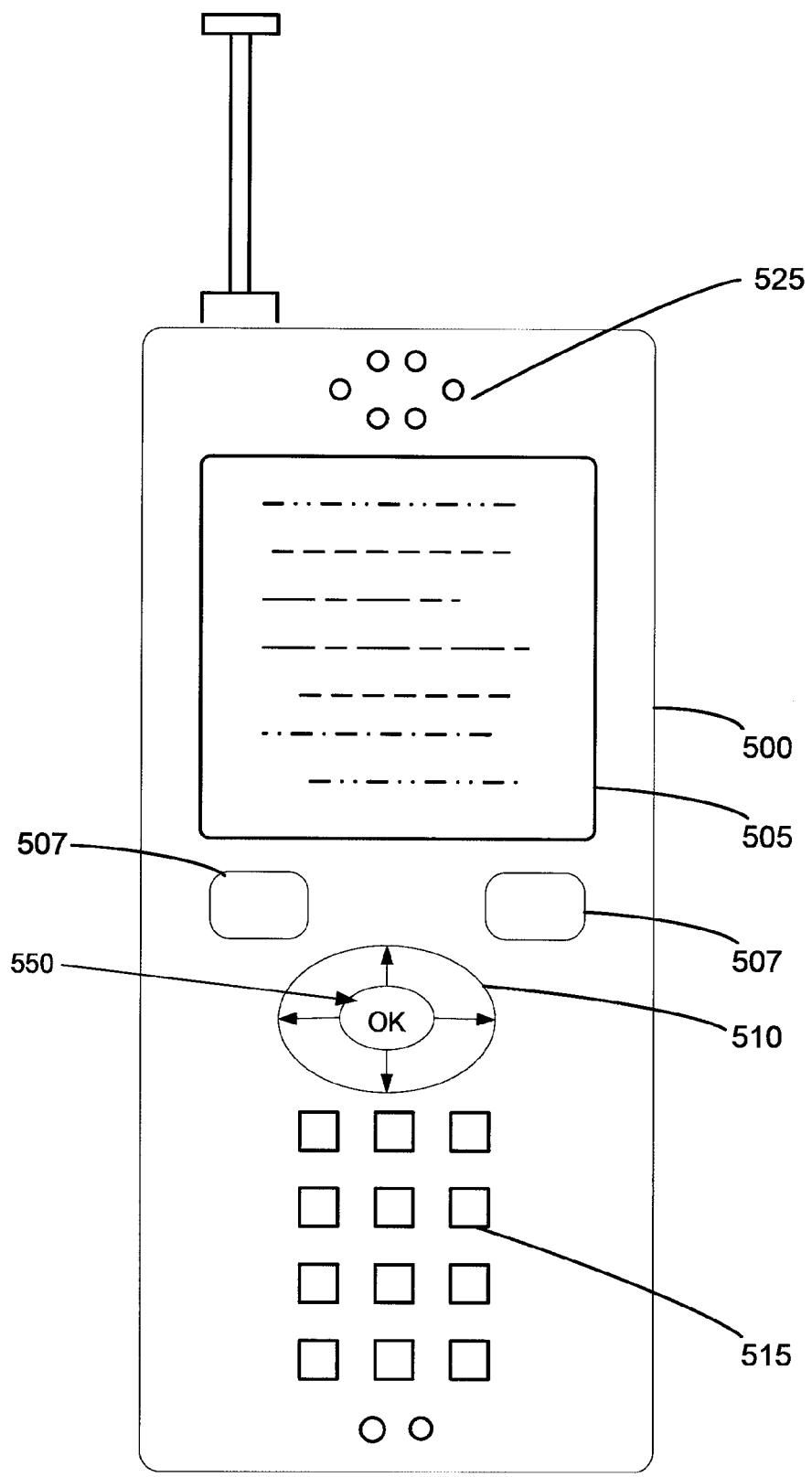
FIG. 5 is an exemplary mobile communications device.

Referring to FIG. 5, illustrated is an exemplary mobile communication device 500, and in particular, the user interface for the device. The device typically includes a display 505 that may comprise an LCD or OLED display. In some embodiments, the display may include touch screen capability. The device may include a keypad 515 that may be a standard phone keypad, or in other embodiments a QWERTY keypad. The device may also include navigation buttons 510 that may further comprise up, down, left, and right keys for navigating through the display 505. The navigation keys may further comprise a selection or OK key 550 to indicate the user's selection or acknowledgment of a particular function. The device may also include soft keys 507 that are programmable and used to select the function as indicated in an area of display 505 near the soft key.

Referring to FIG. 5, in one embodiment the device may illuminate one or more buttons from keypad 515, navigation buttons 510, or OK key 550. The button(s) may illuminate steady in a particular color, or may flash on/off, or in any other manner as configured in the device or by the user to illustrate a given functionality.

Figure 6:
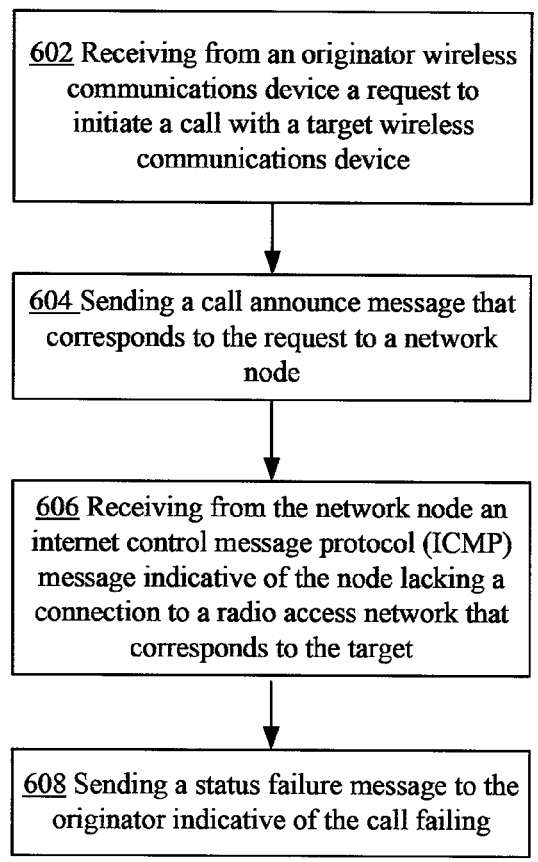
FIG. 6 depicts an exemplary process incorporating some of the embodiments disclosed herein.

FIG. 6 depicts an exemplary process incorporating some of the embodiments of reducing the time to receive a call failure indication in a wireless communications system 10. In an embodiment, the wireless communications system may comprise a CDMA2000 network. The process may begin with receiving at the group communication server 32 from an originator wireless communications device 14 a request to initiate a call with a target wireless communications device (602). The originator device and the target device comprise push-to-talk (PTT) devices. The can be a plurality of target wireless communication devices engaging in voice PTT calls. The process continues with sending a call announce message that corresponds to the request to a network node (604). In an embodiment, the network node comprises a packet data serving node 52.

The process may continue with receiving from the network node an internet control message protocol ("ICMP") message indicative of the node lacking a connection to a radio access network that corresponds to the target device, as shown at step 606. Various PDSNs 52 currently support ICMP messages, such as the PDSN manufactured by UTSTARCOM™. In an embodiment, the message indicative of the node lacking a connection comprises a message indicative of the node lacking an A10 connection. The ICMP message can be one from a set of an ICMP for Internet Protocol version 4 (ICMPv4) message and an ICMP for Internet Protocol version 6 (ICMPv6) message. In an embodiment, the ICMP message further comprises an indication that the network node could not determine an internet protocol ("IP") address for the target. In an embodiment, the PDSN 52 has been modified from its off-the-shelf form to return a meaningful error code, such as "no PPP connection exists for the target."

The process may continue with sending a status failure message to the target device indicative of the call failing, as shown at step 608. The status failure message can be sent on a control channel. In an embodiment, the status failure message will indicate the one or more reasons why the call failed, such as an indication of a "no PPP connection existing for the target." Errors are typically observed in situations where a PDSN 52 has recently restarted, such as after a software crash, or the target wireless device has lost power. These may lead to situations where the server does not know that IP connectivity (via the PDSN 52) has been lost for the target, but the PDSN is aware of this.

Figure 7A:
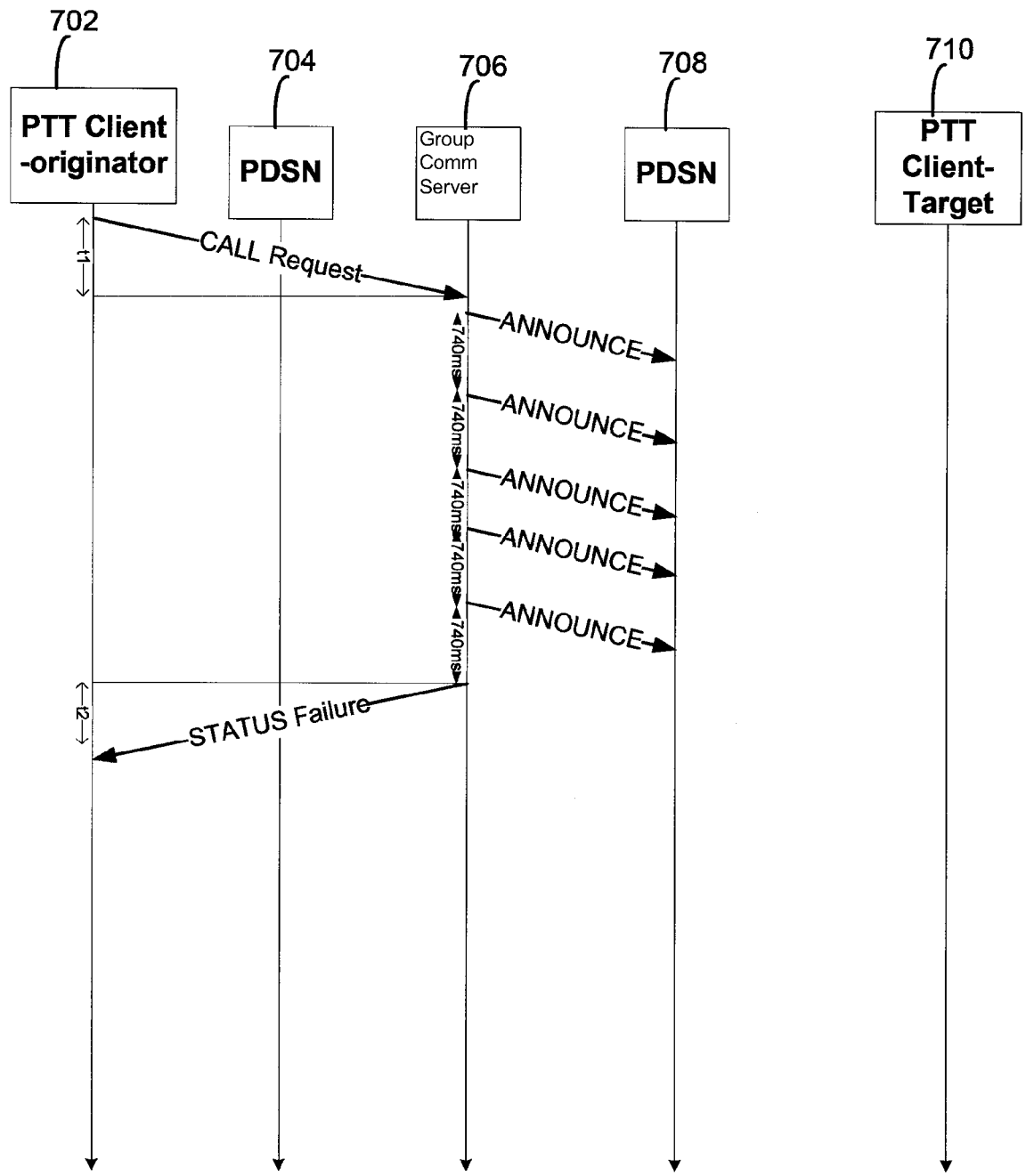
FIG. 7A depicts a call flow diagram of a common technique for receiving a call failure indication in a wireless communications system waiting for an announce mechanism to fail.

FIG. 7A depicts a call flow diagram of prior art techniques for receiving a call failure indication in a wireless communications system. In this diagram, time flows from top to bottom, such that an event occurring near the top of the figure occurs before an event occurring nearer to the bottom of the figure. In an embodiment, the originating wireless communications device 702 may send a CALL Request message intended for a target 710 through a first PDSN 704 to a group communications server 706, and this message takes a time of "t1" to pass from the originator 702 to the server 706. The group communications server 706 receives this message and then sends an ANNOUNCE message to a second PDSN 708 according to a reliability mechanism, where it will retry the ANNOUNCE message if it does not receive a corresponding message from the second PDSN 708. In the present embodiment, where the second PDSN 708 does not have an A10 connection with the appropriate RAN to forward the ANNOUNCE message, it does not forward the announce message and also does not send a message to the group communications server 706.

After the specified timeout period has elapsed, which here, for example, may be 740 ms, the server 706 sends a second ANNOUNCE message to the second PDSN 708. As each timeout period elapses, the group communications server 706 sends another ANNOUNCE message until the present total number of retries of four (for a total of five, including the initial ANNOUNCE message) is reached. Upon the final ANNOUNCE message timing out, the group communications server 706 sends the originator 702 a STATUS Failure message, which takes a time of "t2" to pass from the server 706 to the originator 702.

This technique may takes a period of time equal to the sum of t1, t2 and, for example, 3200 ms (740 ms*5) to operate. Even if t1 and t2 are instantaneous (the sum of the two is typically somewhat less than 150 ms), that is still over three seconds, when a push-to-talk environment typically deal in times a fraction of that length.

Figure 7B:
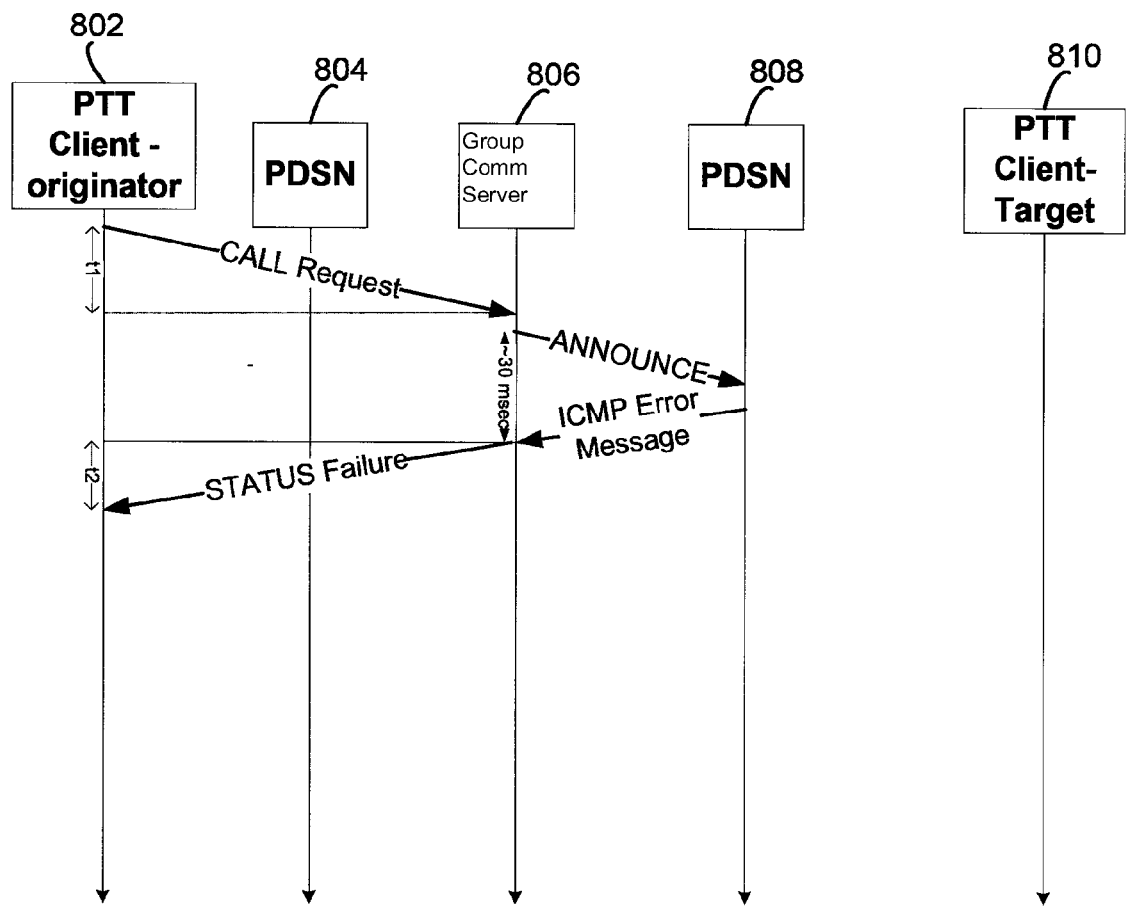
FIG. 7B depicts a call flow diagram for reducing the time to receive a call failure indication in a wireless communications system.

FIG. 7B depicts a call flow diagram for reducing the time to receive a call failure indication in a wireless communications system 10. In this diagram, time flows from top to bottom, such that an event occurring near the top of the figure occurs before an event occurring nearer to the bottom of the figure. In an embodiment, the originating wireless communications device 802 may send a CALL Request message through a first PDSN 804 to a group communications server 806, and this message takes a time of "t1" to pass from the originator to the server 806. This time period is equal to the corresponding time period in the system of FIG. 7A. The group communications server 806 receives this message and sends a corresponding ANNOUNCE message to the second PDSN 808. In the present embodiment, where the second PDSN 808 does not have an A10 connection with the appropriate RAN to forward the ANNOUNCE message, it may not forward the announce message, and immediately sends an ICMP Error Message to the group communications server 806. This period of time from when the group communications server sends the ANNOUNCE message until when it receives the ICMP Error Message depends on factors such as network congestion, but typically lasts around 30 ms. When the group communications server 806 receives the ICMP Error Message, it sends a corresponding STATUS Failure message through the first PDSN 804 to the originator 802, which takes a time of "t2" to pass from the server 806 to the originator 802.

This technique may take a period of time equal to the sum of t1, t2 and, for example, approximately 30 ms to operate. Compared to the sum of t1, t2 and 3200 ms required by the prior art technique of FIG. 7A, this is a savings of over 3 seconds—very significant in a low latency environment such as a push-to-talk system.

Figure 8:
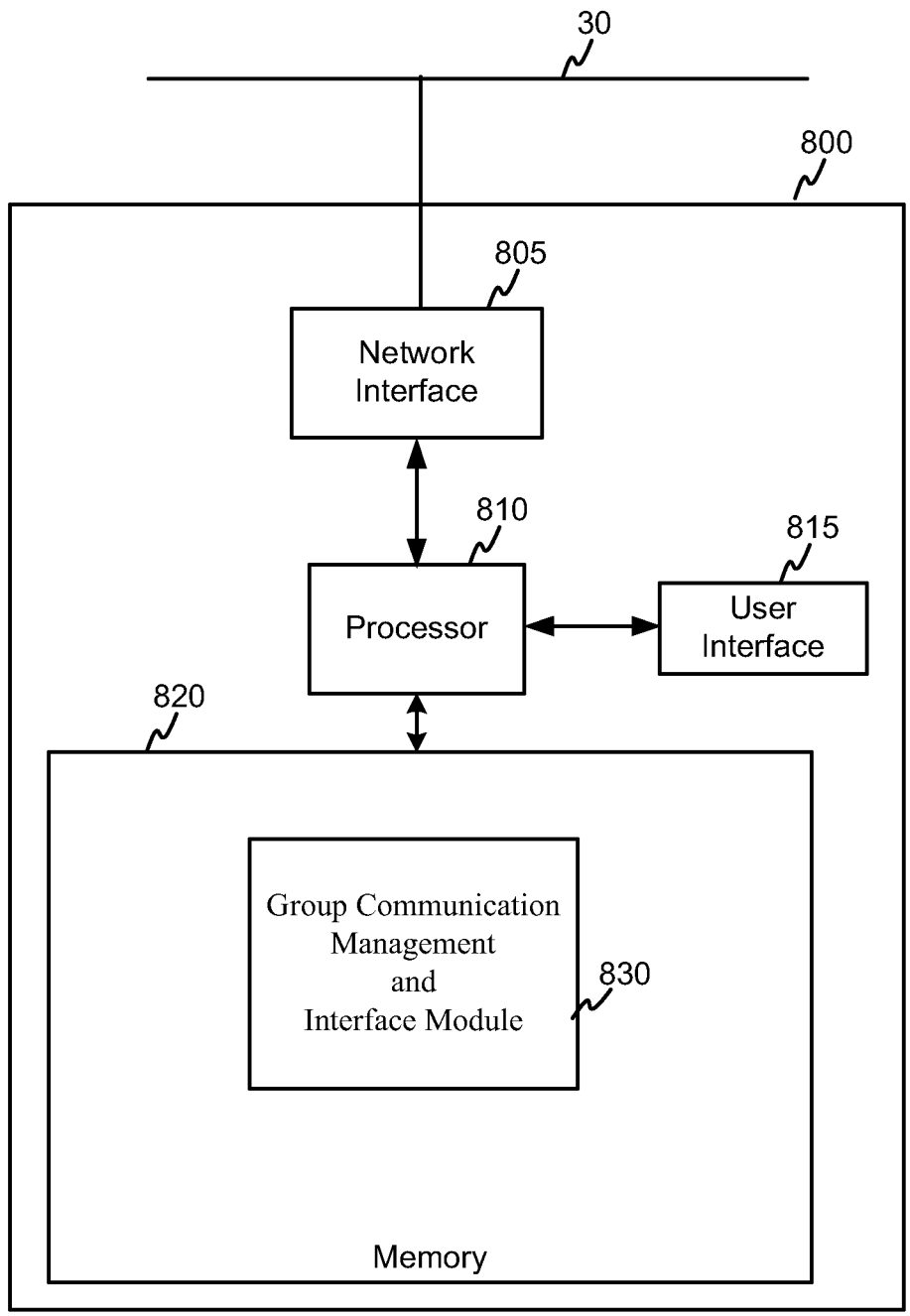
FIG. 8 depicts a block diagram illustrating an exemplary group communications server for use within the wireless communications system.

FIG. 8 is a block diagram illustrating one exemplary embodiment of a group communications server 800 (which may also be a "PTT server" and/or a "call server"). Alternatively, the group communications server 800 may also be referred to herein as a group communication server 32 shown in FIG. 2. The group communications server 800 may be a separate device which can be present on a server-side LAN 30, wherein it functionality is discussed above. For the sake of simplicity, the various features and functions illustrated in the block diagram of FIG. 8 are connected together using a common bus which is meant to represent that these various features and functions are operatively coupled together. Those skilled in the art will recognize that other connections, mechanisms, features, functions, or the like, may be provided and adapted as necessary to operatively couple and configure an actual portable wireless device. Further, it is also recognized that one or more of the features or functions illustrated in the example of FIG. 8 may be further subdivided or two or more of the features or functions illustrated in FIG. 8 may be combined.

The group communications server 800 may include a network interface 805 that may be wired and/or wireless for communicating over the server side LAN. A processor 810 may be connected to the network interface 805, a user interface 815 and memory 820. The processor 810 may include one or more microprocessors, microcontrollers, and/or digital signal processors that provide processing functions, as well as other calculation and control functionality. The processor 810 accesses memory 820 for reading/writing data and/or software instructions for executing programmed functionality. The memory 820 may be on-board the processor 810 (e.g., within the same IC package), and/or the memory may be external memory to the processor and functionally coupled over a data bus.

A number of software modules and/or data tables may reside in memory 820 and be utilized by the processor 810 for managing PTT functionality, including functionality describe above. As illustrated here, within memory 820, the group communications server 800 may further include or otherwise provide a group communication management and interface module 830. While the software module 830 is illustrated in the example as being contained in memory 820, it should be recognized that in certain implementations such procedures may be provided for or otherwise operatively arranged using other or additional mechanisms. For example, all or part of software module 830 may be provided in firmware. Additionally, while in FIG. 8 the software module 830 is shown as a single distinct entity for ease of description, it should be understood that it may include a plurality of modules that are not illustrated, or otherwise be further partitioned into a differing groups of procedures.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for receiving from an originator wireless communications device a request to initiate a call with a target wireless communications device, and sending a call announce message that corresponds to the request to a network node. The method embodied may further include receiving from the network node an internet control message protocol (ICMP) message indicative of the node lacking a connection to a radio access network that corresponds to the target, and sending a status failure message to the originator indicative of the call failing. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for reducing time to receive a call failure indication in a wireless communications system, comprising:
   receiving from an originator wireless communications device a request to initiate a call with a target wireless communications device;
   sending to a packet data serving node (PDSN), a call announce message that corresponds to the request;
   receiving from the PDSN in response to the call announce message, an internet control message protocol (ICMP) message indicative of the PDSN lacking a connection to a radio access network that corresponds to the target wireless communications device; and
   sending a status failure message to the originator wireless communications device indicative of the call failing,
   wherein the status failure message includes information indicative of a reason for failure.

2. The method of claim 1, wherein the originator wireless communications device and the target wireless communications device comprise push-to-talk (PTT) devices.

3. The method of claim 1, wherein the target wireless communications device comprises a plurality of target devices.

4. The method of claim 1, wherein the message indicative of the PDSN lacking a connection comprises a message indicative of the PDSN lacking an A10 connection with the radio access network when the call announce message is received by the PDSN.

5. The method of claim 1, wherein the ICMP message is one from a set, the set comprising an ICMP for Internet Protocol version 4 (ICMPv4) message and an ICMP for Internet Protocol version 6 (ICMPv6) message.

6. The method of claim 1, wherein the call comprises a voice call.

7. The method of claim 1, wherein the wireless communications system comprises a CDMA2000 network.

8. The method of claim 1, wherein sending the status failure message comprises sending the status failure message on a control channel.

9. The method of claim 1, wherein the reason for failure comprises no point-to-point protocol (PPP) connection existing for the target wireless communications device.

10. The method of claim 1, wherein the ICMP message further comprises an indication that the PDSN could not determine an internet protocol (IP) address for the target wireless communications device.

11. A system for reducing time to receive a call failure indication in a wireless communications system, comprising:
    means for receiving from an originator wireless communications device a request to initiate a call with a target wireless communications device;
    means for sending to a packet data serving node (PDSN), a call announce message that corresponds to the request;
    means for receiving from the PDSN in response to the call announce message, an internet control message protocol (ICMP) message indicative of the PDSN lacking a connection to a radio access network that corresponds to the target wireless communications device; and
    means for sending a status failure message to the originator wireless communications device indicative of the call failing,
    wherein the status failure message includes information indicative of a reason for failure.

12. The system of claim 11, wherein the originator wireless communications device and the target wireless communications device comprise push-to-talk (PTT) devices.

13. The system of claim 11, wherein the target wireless communications device comprises a plurality of target devices.

14. The system of claim 11, wherein the message indicative of the PDSN lacking a connection comprises a message indicative of the PDSN lacking an A10 connection with the radio access network when the call announce message is received by the PDSN.

15. The system of claim 11, wherein the ICMP message is one from a set, the set comprising an ICMP for Internet Protocol version 4 (ICMPv4) message and an ICMP for Internet Protocol version 6 (ICMPv6) message.

16. The system of claim 11, wherein the call comprises a voice call.

17. The system of claim 11, wherein the wireless communications system comprises a CDMA2000 network.

18. The system of claim 11, wherein the means for sending the status failure message sends the status failure message on a control channel.

19. The system of claim 11, wherein the reason for failure comprises no point-to-point protocol (PPP) connection existing for the target wireless communications device.

20. The system of claim 11, wherein the ICMP message further comprises an indication that the PDSN could not determine an internet protocol (IP) address for the target wireless communications device.

21. A non-transitory computer-readable medium having instructions embodied thereon, comprising:
- a set of instructions to receive from an originator wireless communications device a request to initiate a call with a target wireless communications device;
- a set of instructions to send to a packet data serving node (PDSN), a call announce message that corresponds to the request;
- a set of instructions to receive from the PDSN in response to the call announce message, an internet control message protocol (ICMP) message indicative of the PDSN lacking a connection to a radio access network that corresponds to the target wireless communications device; and
- a set of instructions to send a status failure message to the originator wireless communications device indicative of the call failing,
- wherein the status failure message includes information indicative of a reason for failure.

22. The computer-readable medium of claim 21, wherein the originator wireless communications device and the target wireless communications device comprise push-to-talk (PTT) devices.

23. The computer-readable medium of claim 21, wherein the target wireless communications device comprises a plurality of target devices.

24. The computer-readable medium of claim 21, wherein the message indicative of the PDSN lacking a connection comprises a message indicative of the PDSN lacking an A10 connection with the radio access network when the call announce message is received by the PDSN.

25. The computer-readable medium of claim 21, wherein the ICMP message is one from a set, the set comprising an ICMP for Internet Protocol version 4 (ICMPv4) message and an ICMP for Internet Protocol version 6 (ICMPv6) message.

26. The computer-readable medium of claim 21, wherein the call comprises a voice call.

27. The computer-readable medium of claim 21, wherein the set of instructions to send the status failure message send the status failure message on a control channel.

28. The computer-readable medium of claim 21, wherein the reason for failure comprises no point-to-point protocol (PPP) connection existing for the target wireless communications device.

29. The computer-readable medium of claim 21, wherein the ICMP message further comprises an indication that the PDSN could not determine an internet protocol (IP) address for the target wireless communications device.

30. An apparatus for reducing time to receive a call failure indication in a wireless communications system, comprising:
- a processor; and
- a memory coupled to the processor, wherein the memory stores instructions causing the processor to receive from an originator wireless communications device a request to initiate a call with a target wireless communications device,
- send to a packet data serving node (PDSN), a call announce message that corresponds to the request to a,
- receive from the PDSN in response to the call announce message, an internet control message protocol (ICMP) message indicative of the PDSN lacking a connection to a radio access network that corresponds to the target wireless communications device, and
- send a status failure message to the originator wireless communications device indicative of the call failing,
- wherein the status failure message includes information indicative of a reason for failure.

31. The apparatus of claim 30, wherein the originator wireless communications device and the target wireless communications device comprise push-to-talk (PTT) devices.

32. The apparatus of claim 30, wherein the target wireless communications device comprises a plurality of target devices.

33. The apparatus of claim 30, wherein the message indicative of the PDSN lacking a connection comprises a message indicative of the PDSN lacking an A10 connection with the radio access network when the call announce message is received by the PDSN.

34. The apparatus of claim 30, wherein the ICMP message is one from a set, the set comprising an ICMP for Internet Protocol version 4 (ICMPv4) message and an ICMP for Internet Protocol version 6 (ICMPv6) message.

35. The apparatus of claim 30, wherein the call comprises a voice call.

36. The apparatus of claim 30, wherein the wireless communications system comprises a CDMA2000 network.

37. The apparatus of claim 30, wherein the instructions causing the processor to send the status failure message cause the processor to send the status failure message on a control channel.

38. The apparatus of claim 30, wherein the reason for failure comprises no point-to-point protocol (PPP) connection existing for the target wireless communications device.

39. The apparatus of claim 30, wherein the ICMP message further comprises an indication that the PDSN could not determine an internet protocol (IP) address for the target wireless communications device.

* * * * *